United States Patent [19]

Salesin et al.

[11] Patent Number: 5,594,853
[45] Date of Patent: Jan. 14, 1997

[54] METHOD AND SYSTEM FOR EDITING THE GENERAL SWEEP AND DETAIL OF A FIGURE WITH A CURVE

[75] Inventors: David H. Salesin; Adam Finkelstein, both of Seattle, Wash.

[73] Assignee: University of Washington, Seattle, Wash.

[21] Appl. No.: 367,946

[22] Filed: Jan. 3, 1995

[51] Int. Cl.⁶ .................................................. G06T 9/00
[52] U.S. Cl. ......................... 395/141; 395/133; 395/135
[58] Field of Search .................................. 395/141–143, 395/133, 135; 382/266–270, 232, 243, 248, 308

[56] References Cited

U.S. PATENT DOCUMENTS

| | | | |
|---|---|---|---|
| 4,661,986 | 4/1987 | Adelson | 358/227 X |
| 4,692,806 | 9/1987 | Anderson et al. | 358/209 |
| 4,703,514 | 10/1987 | van der Wal | 358/284 X |
| 4,821,214 | 4/1989 | Sederberg | 395/120 |
| 4,912,657 | 3/1990 | Saxton et al. | 395/155 |
| 5,067,014 | 11/1991 | Bergen et al. | 382/107 |
| 5,159,697 | 10/1992 | Burt | 382/103 |
| 5,187,754 | 2/1993 | Currin et al. | 382/263 |
| 5,325,449 | 6/1994 | Burt et al. | 382/233 |

OTHER PUBLICATIONS

Stollnitz, Eric J. et al., *Wavelets for Computer Graphics: A Primer*, Technical Report 94–09–11, University of Washington, Sep. 1994.

Finkelstein, Adam and David H. Salesin, *Multiresolution Curves*, Technical Report 94–01–06, University of Washington, Jan. 1994.

Forsey, David R. and Richard H. Bartels, "Hierarchical B–Spline Refinement," *Computer Graphics,* 22:(4), pp. 205–212, 1988.

Forsey, David R. and Richard H. Bartels, "Tensor Products and Hierarchical Fitting," *SPIE vol. 1610 Curves and Surfaces in Computer Vision and Graphics II*, pp. 88–96, 1991.

*Primary Examiner*—Almis R. Jankus
*Attorney, Agent, or Firm*—Seed and Berry LLP

[57] ABSTRACT

A method and system for editing a figure is provided. The method performs the steps of storing a representation of the figure in digital format in a storage medium, separating the representation of the figure into a general sweep feature and a detail feature, and editing at least one of the general sweep feature and/or the detail feature to produce a processed general sweep feature and a processed detail feature. The processed general sweep feature and the processed detail feature are then combined into an edited representation of the figure, which is output from the storage medium.

32 Claims, 19 Drawing Sheets

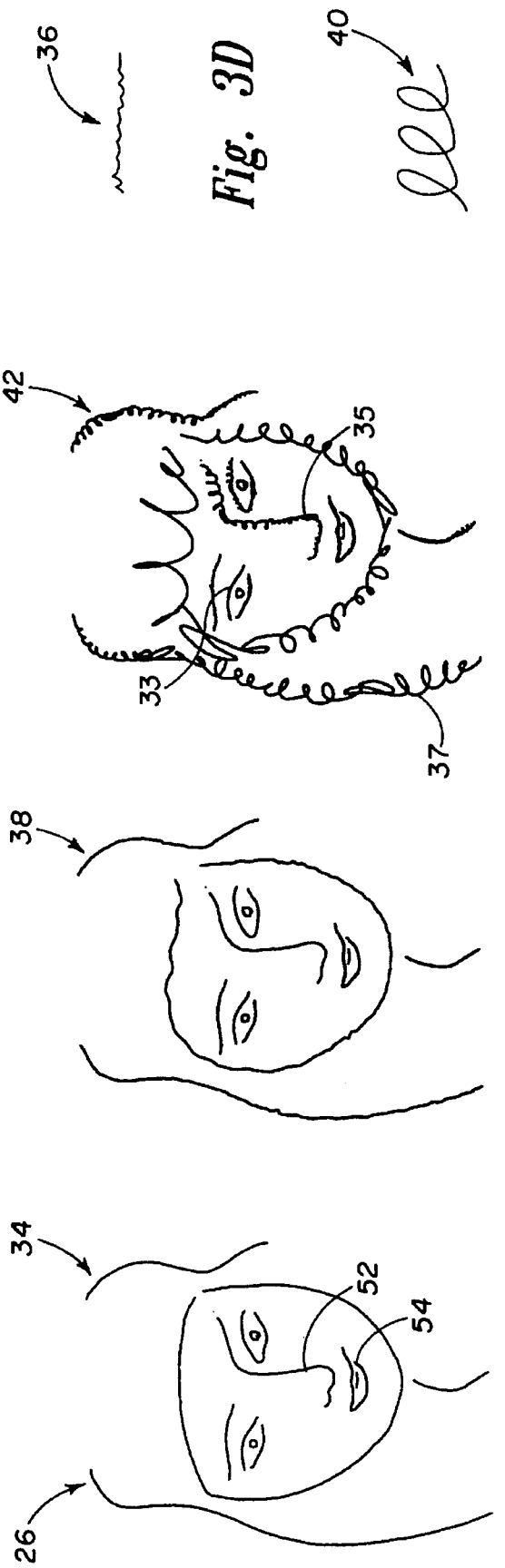

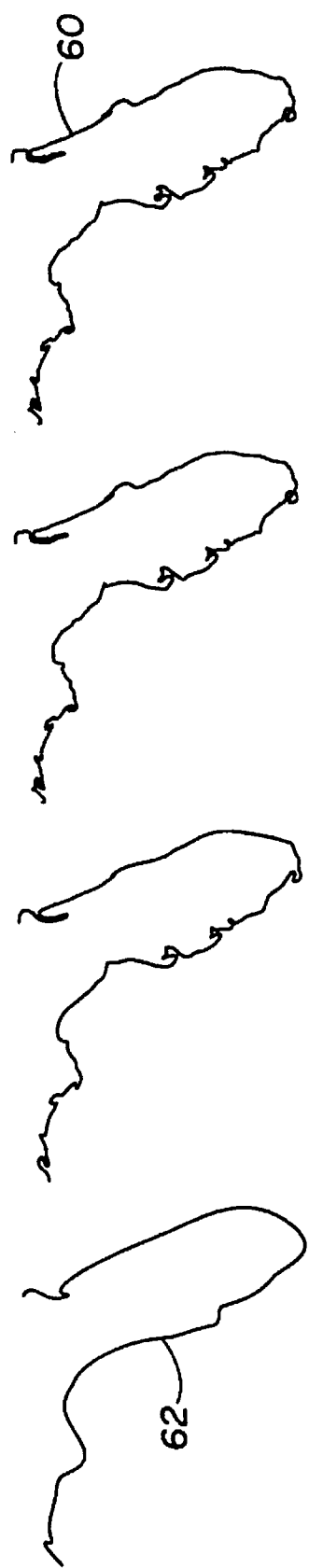

Fig. 14A
(Prior Art)

$$P^1 = \frac{1}{16} \begin{bmatrix} 16 & 0 & 0 & 0 \\ 8 & 8 & 0 & 0 \\ 0 & 8 & 8 & 0 \\ 0 & 0 & 8 & 8 \\ 0 & 0 & 0 & 16 \end{bmatrix}$$

Fig. 14B
(Prior Art)

$$P^2 = \frac{1}{16} \begin{bmatrix} 16 & 0 & 0 & 0 & 0 \\ 8 & 8 & 0 & 0 & 0 \\ 0 & 12 & 4 & 0 & 0 \\ 0 & 3 & 10 & 3 & 0 \\ 0 & 0 & 4 & 12 & 0 \\ 0 & 0 & 0 & 8 & 8 \\ 0 & 0 & 0 & 0 & 16 \end{bmatrix}$$

Fig. 14C
(Prior Art)

$$P^{j \geq 3} = \frac{1}{16} \begin{bmatrix} 16 & 0 & 0 & 0 & 0 & 0 \\ 8 & 8 & 0 & 0 & 0 & 0 \\ 0 & 12 & 4 & 0 & 0 & 0 \\ 0 & 3 & 11 & 2 & 0 & 0 \\ 0 & 0 & 8 & 8 & 0 & 0 & \cdots \\ 0 & 0 & 2 & 12 & 2 & 0 \\ 0 & 0 & 0 & 8 & 8 & 0 \\ 0 & 0 & 0 & 2 & 12 & 2 \\ 0 & 0 & 0 & 0 & 8 & 8 \\ 0 & 0 & 0 & 0 & 2 & 12 \\ & & & \vdots & & \ddots \end{bmatrix}$$

$$Q^1 = \frac{1}{3}\begin{bmatrix} 1 \\ -2 \\ 3 \\ -2 \\ 1 \end{bmatrix}$$

Fig. 14D
*(Prior Art)*

$$Q^2 = \frac{1}{2064}\begin{bmatrix} -1368 & 0 \\ 2064 & 240 \\ -1793 & -691 \\ 1053 & 1053 \\ -691 & -1793 \\ 240 & 2064 \\ 0 & -1368 \end{bmatrix}$$

Fig. 14E
*(Prior Art)*

$$Q^3 = \begin{bmatrix} \frac{-394762}{574765} & 0 & 0 & 0 \\ 1 & \frac{-7166160}{28124263} & 0 & 0 \\ \frac{-33030599}{41383080} & \frac{333497715}{478112471} & \frac{6908335}{478112471} & 0 \\ \frac{633094403}{1655323200} & \frac{-881412943}{956224942} & \frac{-74736797}{956224942} & \frac{27877}{1655323200} \\ \frac{-19083341}{137943600} & 1 & \frac{8833647}{28124263} & \frac{-864187}{413830800} \\ \frac{4681957}{165532320} & \frac{-689203555}{956224942} & \frac{-689203555}{956224942} & \frac{4681957}{165532320} \\ \frac{-864187}{413830800} & \frac{8833647}{28124263} & 1 & \frac{-19083341}{137943600} \\ \frac{27877}{1655323200} & \frac{-74736797}{956224942} & \frac{-881412943}{956224942} & \frac{633094403}{1655323200} \\ 0 & \frac{6908335}{478112471} & \frac{333497715}{478112471} & \frac{-33030599}{41383080} \\ 0 & 0 & \frac{-7166160}{28124263} & 1 \\ 0 & 0 & 0 & \frac{-394762}{574765} \end{bmatrix}$$

*Fig. 14F*
(Prior Art)

$$Q^{j\geq 4} = \begin{bmatrix} \frac{-394762}{574765} & 0 & 0 & 0 \\ 1 & \frac{-1050072320}{4096633377} & 0 & 0 \\ \frac{-33030599}{41383080} & \frac{2096854390}{2989435167} & \frac{307090}{19335989} & 0 \\ \frac{633094403}{1655323200} & \frac{-11070246427}{11957740668} & \frac{-6643465}{77343956} & \frac{-1}{24264} \\ \frac{-19083341}{137943600} & 1 & \frac{6646005}{19335989} & \frac{31}{6066} \\ \frac{4681957}{165532320} & \frac{-157389496903}{221218202358} & \frac{-29839177}{38671978} & \frac{-559}{8088} \\ \frac{-864187}{413830800} & \frac{1732435193}{5821531641} & 1 & \frac{988}{3033} & \cdots \\ \frac{27877}{1655323200} & \frac{-27809640281}{442436404716} & \frac{-58651607}{77343956} & \frac{-9241}{12132} \\ 0 & \frac{171326708}{36869700393} & \frac{6261828}{19335989} & 1 \\ 0 & \frac{-1381667}{36869700393} & \frac{-1328199}{19335989} & \frac{-9241}{12132} \\ 0 & 0 & \frac{98208}{19335989} & \frac{988}{3033} \\ 0 & 0 & \frac{-792}{19335989} & \frac{-559}{8088} \\ 0 & 0 & 0 & \frac{31}{6066} \\ 0 & 0 & 0 & \frac{-1}{24264} \\ \vdots & & & & \ddots \end{bmatrix}$$

Fig. 14G
*(Prior Art)*

$$I^{j\geq 3} = \frac{1}{10080 \cdot 2^j} \begin{bmatrix} 1440 & 882 & 186 & 12 & 0 & 0 & 0 & 0 & \cdots \\ 882 & 2232 & 1575 & 348 & 3 & 0 & 0 & 0 \\ 186 & 1575 & 3294 & 2264 & 239 & 3 & 0 & 0 \\ 12 & 348 & 2264 & 4832 & 2382 & 239 & 2 & 0 \\ 0 & 3 & 239 & 2382 & 4832 & 2382 & 240 & 2 \\ 0 & 0 & 3 & 239 & 2382 & 4832 & 2382 & 240 \\ 0 & 0 & 0 & 2 & 240 & 2382 & 4832 & 2382 \\ 0 & 0 & 0 & 0 & 2 & 240 & 2382 & 4832 \\ & & & \vdots & & & & & \ddots \end{bmatrix}$$

*Fig. 14H*
*(Prior Art)*

METHOD AND SYSTEM FOR EDITING THE GENERAL SWEEP AND DETAIL OF A FIGURE WITH A CURVE

TECHNICAL FIELD

The present invention relates to a method of editing a figure, and more particularly to a method of editing the sweep and detail of a figure.

BACKGROUND OF THE INVENTION

This invention was made with government support under grant number CCR-9357790 awarded by the National Science Foundation. The government has certain rights in the invention.

Computer graphics, computer-aided design, key frame animation, 3D modeling, graphic design, font design, pen-and-ink illustration, as well as many other examples, all require the ability to edit or smooth a figure. The figures generated in these fields can be easily represented using curves that are capable of being depicted at different resolutions, i.e., multiresolution curves. For example, in computer-aided design, cross-sectional curves are frequently used in the specification of surfaces. In 3D modeling and animation, "backbone" curves can be manipulated to specify object deformations. Further, in graphic design, curves can be used to describe regions of constant color or texture. Finally, in font design, curves can be used to represent the outlines of characters.

Various forms of editing figures through computer graphic manipulation are presently known in the art. For example, hierarchical B-splines have been employed to address the problem of editing the overall form of a surface while maintaining its details. This type of formulation, as described in Forsey and Bartels, "Hierarchical B-Spline," Computer Graphics 22(4):205–212, 1988, requires the user to design an explicit hierarchy into the representative model. Further, Forsey and Bartels, "Curves and Surfaces in Computer Vision and Graphics," SPIE Proceedings 1610:88–96, 1991, describes a method of editing that recursively fits a hierarchical surface to a set of data by first fitting a course approximation and then refining in areas where the residual is large. However, when using this method, there are an infinite number of possible representations for the same surface.

In Fowler, "Geometric Manipulation of Tensor Product Services," Proceedings of the 1992 Symposium on Interactive 3D Graphics, March 1992, and Welch and Witkin, "Variational Surface Modeling," Computer Graphics 26(2):157–166, 1992, methods of editing that can be performed over narrower or broader regions of a surface are described. However, none of these methods have attempted to preserve the higher-resolution detail beneath an edited region. Further, there has been no way to obtain a unique representation for a given shape using these methods. Finally, none of the above-mentioned methods have the ability to edit a curve at any continuous level of detail nor do they have any ability to change a curve's character without affecting its overall sweep.

A figure may be presented in many ways, one convenient form of representation uses at least one multiresolution B-spline curve. Multiresolution B-spline curves are well-known in the prior art and a person of skill in the art is familiar with them, as described in many of the publications cited herein. The multiresolution B-spline curve can be expressed as a discrete signal $C^n$ and represented by a column vector of samples $[c_1^n, \ldots, c_m^n]^T$. These samples $c_i^n$ can be thought of as the curve's control points in tow-dimensional space.

The following slightly generalized version of multiresolution analysis is convenient for representing figures made up of open curves, as is known in the prior art. For further discussion on this form of analysis, see Lounsbery, DeRose, Warren, "Multiresolution Surfaces of Arbitrary topological Type," Technical Report 39-10-05B, University of Washington, Dept. of Computer Science and Engineering, January 1994.

Initially, a curve expressed by a discrete signal $C^n$ that uses m samples, or control points, can be filtered by an analysis filter $A^n$ to create a low-resolution version $C^{n-1}$. The low resolution version $C^{n-1}$ uses m' samples, which is less than the m samples used by the discrete signal $C^n$. Filtering and down sampling of the m samples of $C^n$ will create the m' samples of $C^{n-1}$. This process can be expressed by the following matrix equation:

$$C^{n-1} = A^n C^n \qquad (1)$$

where $A^n$ is an m'×m matrix.

Since $C^{n-1}$ contains fewer samples than $C^n$, it is intuitively clear that some amount of detail is lost in this filtering process. However, if $A^n$ is appropriately chosen, it is possible to capture the lost detail of $C^n$ as another signal $D^{n-1}$ using analysis filter $B^n$. This separated detail can be obtained by the following matrix equation:

$$D^{n-1} = B^n C^n \qquad (2)$$

where $B^n$ is an (m–m')×m matrix, which is related to matrix $A^n$. This process of separating the representation of the figure, signal $C^n$, into a low-resolution version $C^{n-1}$ and detail $D^{n-1}$ is called decomposition. The advantage of saving the detail $D^{n-1}$ is that the original signal $C^n$ can be recovered from $C^{n-1}$ and $D^{n-1}$ by using another pair of matrices $P^n$ and $Q^n$, called synthesis filters, as follows:

$$C^n = P^n C^{n-1} + Q^n D^{n-1} \qquad (3)$$

This recovery of $C^n$ from $C^{n-1}$ and $D^{n-1}$ is called reconstruction.

The procedure for separating $C^n$ into a low-resolution part $C^{n-1}$ and a detail part $D^{n-1}$ can be applied recursively to the new signal $C^{n-1}$ in a process know as a filter bank. Thus, the original signal can be expressed as a hierarchy of lower-resolution signals $C^0, \ldots, C^{n-1}$ and details $D^0, \ldots, D^{n-1}$, as shown in FIGS. 12A–C.

Since the original signal $C^n$ can be recovered from the sequence $C^0, D^0, D^1, \ldots, D^{n-1}$, this sequence can be thought of as a transform of the original signal, and is known as a wavelet transform. One advantage to using the wavelet transform is that the total size of the transform $C^0, D^0, \ldots, D^{n-1}$ is the same as that of the original signal $C^n$, so no extra storage is required.

Wavelet transforms have a number of properties that make them attractive for signal processing. For example, if the filters $A^j$, $B^j$, $P_j$, and $Q^j$ are constructed to be sparse, then the filter bank operation can be performed very quickly, often in O(m) time. Also, for many of the signals encountered in practice, a large percentage of the entries in the wavelet transform are negligible. Wavelet compression methods can therefore approximate the original set of samples in $C^n$ by storing only the significant coefficients of the wavelet transform.

Wavelets have a variety of applications, for example, wavelets have been used in signal analysis, as discussed in Mallat, "A theory for Multiresolution Signal Decomposition: The Wavelet Representation," IEEE transactions on Pattern Analysis and Machine Intelligence 11(7):674–693, July 1989. Wavelets have also been used in image processing and numerical analysis, as discussed in DeVore, Jawerth, and Lucier, "Image Compression Through Wavelet Transform Coding," IEEE Transactions on Information Theory 38(2):719–746, March 1992 and Beylkin, Coifman and Rokhlin, "Fast Wavelet Transforms and Numerical Algorithm I," Communications on Pure and Applied Mathematics 44:141–183, 1991, respectively.

All that is required for performing a wavelet transform is an appropriate set of analysis and synthesis filters $A^j$, $B^j$, $P^j$, and $Q^j$. To see how to construct these filters, each signal $C^n$ is associated with a function $f^n(u)$ with $u \in [0, 1]$ given by:

$$f^n(u) = \Phi^n(u) C^n \tag{4}$$

where $\Phi^n(u)$ is a row matrix of basis functions $[\phi_1^n(u), \ldots, \phi_m^n(u)]$, called scaling functions. The scaling functions can be endpoint-interpolating B-splines basis functions, making the function $f^n(u)$ an endpoint-interpolating B-spline curve.

The scaling functions are required to be refinable; that is, for all $j$ in $[1, n]$ there must exist a matrix $P^j$ such that $$\Phi^{j-1} = \Phi^j P^j \tag{5}$$

In other words, each scaling function at level $j-1$ must be expressible as a linear combination of "finer" scaling functions at level $j$. As suggested by the notation, the refinement matrix in equation (5) turns out to be the same as the synthesis filter $P^j$.

Next, let $V^j$ be the linear space spanned by the set of scaling functions $\Phi^j$. The refinement condition of $\Phi^j$ implies that these linear spaces are nested: $V^0 \subset V^1 \subset \ldots \subset V^n$. Choosing an inner product for the basis functions in $V^j$ allows the definition of $W^i$ as the orthogonal complement of $V^j$ in $V^{j+1}$, that is, the space $W^j$ whose basis functions $\Psi^j = [\psi_1^j(u), \ldots, \psi_{m-m'}^j(u)]$ are such that $\Phi^j$ and $\Psi^j$ together form a basis for $V^{j+1}$, and every $\psi_i^j(u)$ is orthogonal to every $\phi_i^j(u)$ under the chosen inner product. The basis functions $\psi_i^j(u)$ are called wavelets.

The synthesis filter $Q^j$ can be constructed as the matrix that satisfies:

$$\Psi^{j-1} = \Phi^j Q^j. \tag{6}$$

Equations (5) and (6) can be expressed as a single equation by concatenating the matrices together:

$$[\Phi^{j-1} | \Psi^{j-1}] = \Phi^j [P^j | Q^j]. \tag{7}$$

Finally, the analysis filter $A^j$ and $B^j$ are formed by the matrices satisfying the inverse relation:

$$[\Phi^{j-1} | \Psi^{j-1}] \left[ \frac{A^j}{B^j} \right] = \Phi^j. \tag{8}$$

Note that $[P^j|Q^j]$ and $[A^j|B^j]^T$ are both square matrices. Thus, $$\left[ \frac{A^j}{B^j} \right] = [P^j|Q^j]^{-1}, \tag{9}$$

from which it is easy to prove a number of useful identities:

$$A^j Q^j = B^j P^j = 0, \tag{10a}$$

$$A^j P^j = B^j Q^j = P^j A^j + Q^j B^j = 1, \tag{10b}$$

where 0 and 1 are the matrix of zeros and the identity matrix, respectively.

B-splines defined on a knot sequence that is uniformly spaced everywhere except at its ends, where its knots have multiplicity 4 are commonly referred to as endpoint-interpolating cubic B-splines. The basic concepts of cubic B-spline curves are discussed in detail in many texts on computer-aided design, such as Bartels, Beatty, and Barsky, An Introduction to Splines for Use in Computer Graphics and Geometric Modeling, Morgan Kaufman, 1987; Farin Curves and Surfaces for Computer Aided Geometric Design, Academic Press, 3rd ed., 1992; and Hoschek and Laser, Fundamentals, of Computer Aided Geometric Design, A. K. Peters, Ltd., Wellesley, Mass., 3rd ed. 1992.

To construct multiresolution curves from endpoint-interpolating cubic B-splines, several choices must be made. Initially, the scaling functions $\Phi^j(u)$ should be chosen for all $j$ in $[0, n]$. The chosen scaling functions determine the synthesis filters $P^j$. Further, for each level $j$, there should be a basis for the endpoint-interpolating cubic B-spline curves for $2^j$ interior segments. The basis functions for these curves are the $2^j+3$ endpoint-interpolating cubic B-splines, which are refinable, as is required by equation (5), discussed above. Secondly, an inner product for any two functions $f$ and $g$ in linear space $V^j$ should be chosen. This chosen determines the orthogonal complement spaces $W^j$. In this case, the standard form $<f, g> = \int f(u)g(u)du$ can be used. Finally, a set of wavelets $\psi^j(u)$ that span $W^j$ should be selected. This choice determines the synthesis filters $Q^j$. Together, the synthesis filters $P^j$ and $Q^j$ can determine the analysis filters $A^j$ and $B^j$, as shown in equation (9). It is preferable to use the set of $2^j$ minimally-supported functions that span $W^j$. Given the teachings of this disclosure, those of skill in the art will be able to make the particular choices most beneficial for the scaling functions, inner product, and a set of wavelets; examples of each are given herein only as a guide, and others may be used.

As discussed above, multiresolution analysis is completely determined by an initial set of scaling functions $\Phi^0$ and a pair of synthesis filters $P^j$ and $Q^j$ for every level $j$ in $[1, n]$. The following shown in FIGS. 13A–E are some examples of endpoint-interpolating cubic B-spline scaling functions and wavelets.

Initial scaling functions are given by the four cubic Bernstein polynomials:

$$\Phi^0(u) = [(1-u)^3, 3u(1-u)^2, 3u^2(1-u), u^3] \tag{11}$$

FIGS. 14 A–G depict the matrices $P^j$ and $Q^j$ for the scaling functions discussed above. Note that $P^j$ is a matrix with dimensions $(2^j+3) \times (2^{j-1}+3)$ whose middle columns, for $j \geq 3$, are given by vertical translates of the fourth column, shifted down by two places for each column. Matrix $Q^j$ has the same structure for $j \geq 4$, except with dimensions $(2^j+3) \times 2^{j-1}$.

The $P^j$ matrix is a straightforward derivation form the Cox-de Boor recursion formula, as discussed in Farin, Curves and Surfaces for Computer Aided Geometric Design, Academic Press, 3rd ed., 1992. The formula encodes how each endpoint-interpolating B-spline can be expressed as a linear combination of B-splines that are half as wide. To derive the $Q^j$ matrix, some new notation is used. Given two row vectors of functions X and Y, let $[<X|Y>]$ be the matrix of inner products $(X_k, Y_l)$. Since, by definition, scaling functions an wavelets at the same level $j$ are orthogonal, it follows that:

$$[<\Phi^j|\Psi^j>] = [<\Phi^j|\Phi^{j+1}>]Q^{j+1} = 0 \tag{12}$$

so the columns of $Q^{j+1}$ span the null space of $[<\Phi^j|\Phi^{j+1}>]$. A basis for this null space can be chosen by finding the matrix $Q^{j+1}$ that has columns with the shortest runs of non-zero coefficients; this matrix corresponds to the wavelets with minimal support. The entries of the inner product matrix can be computed exactly with symbolic integration; thus, the fractions depicted in FIGS. 14A–H are exact.

A construction related to the above has also been independently proposed by Chui and Quak, Wavelets on a Bounded Interval, Numerical Methods in Approximation theory, Vol. 9, pp. 53–75, Birkhauser Verlag, Basel, 1992. Multiresolution constructions can be built for other types of splines as well, such as uniform B-splines, as discussed in Chui, An Introduction to Wavelets, Academic Press, Boston, 1992, and nonuniform B-splines with arbitrary knot sequences, as discussed in Lyche and Morken, Splinewavelets of Minimal Support, Numerical Methods of Approximation Theory, Vol. 9, pp. 177–194, Birkhuaser Verlag, Basel, 1992.

Because both the scaling functions and wavelets have compact support, the synthesis filters $P^j$ and $Q^j$ have a banded structure, allowing reconstruction in O(m) time. However, a potential weakness of this construction is that the analysis filters $A^j$ and $B^j$ are dense, which would seem to imply an $O(m^2)$—time decomposition algorithm. Fortunately, there is a shortcut method, described in Quak and Weyrich, "Decomposition and Reconstruction Algorithms for Spline Wavelets on a Bounded Interval," CAT Report 294, Center for Approximation Theory, Texas A&M University, April 1993, for performing the decomposition in linear time. The algorithm for performing the algorithm in linear time, uses a transformation to the "dual space." The following is a summarization of how the linear-time algorithm can be implemented.

Let $I^j$ and $J^j$ be the inner product matrices $[<\Phi^j|\Phi^j>]$ and $[<\Psi^j|\Psi^j>]$, respectively. Equations (1) and (2) can then be rewritten:

$$I^{j-1}C^{j-1}=(P^j)^T I^j C^j \quad (13a)$$

$$J^{j-1}D^{j-1}=(Q^j)^T I^j C^j. \quad (13b)$$

Since, $P^j$, $Q^j$, and $I^j$ are banded matrices the right-hand side of these equations can be computed in linear time. What remains are two-band diagonal systems of equations, which can also be solved in linear time using LU decompositions, as discussed in Press, Flannery, Teukolsky and Fetterling, Numerical Recipes, University Press, Cambridge, second edition, 1992.

The matrix $I^j$ for $j \geq 3$ is shown in FIG. 14H. Note the $I^j$ is a symmetric matrix with dimensions $(2^j+3) \times (2^j+3)$ whose middle columns for $j \geq 3$, are given by vertical translates of the sixth column. The $I^j$ matrices for $j<3$ and the $J^j$ matrices can be determined with the following equations:

$$I^j=(P^{j+1})^T I^{j+1} P^{j+1} \quad (14a)$$

$$J^j=(Q^{j+1})^T I^{j+1} Q^{j+1} \quad (14b)$$

An even better approach than discribed in Quak and Weyrich involves computing $C^{j-1}$ and $D^{j-1}$ from $C^j$ by solving the sparse linear system:

$$[P^j|Q^j] \left[ \frac{C^{j-1}}{D^{j-1}} \right] = C^j.$$

The matrix $[P^j|Q^j]$ can then be made into a banded matrix simply by interspersing the columns of $P^j$ and $Q^j$. The resulting banded system can then be solved in linear time using LU decomposition, as described in Press, Flannery, Teukolsky, and Fetterling, Numerical Recipies, Cambridge University Press, second edition, 1992.

These are known figure editing methods for curve and surface smoothing that minimize various energy norms. However, these methods of editing are not for the multiresolution curves discussed above. A survey of these methods can be found at Hoschek and Lasser, Fundamentals of Computer-Aided Geometric Design, A. K. Peters, Ltd., Wellesley, Mass. 3rd., 1992. One method mentioned in the survey uses a fairness functional on hand-drawn curves as well as surfaces. For a more detailed description, see Celniker and Gossard, "Deformable Curve and Surface Finite Elements for Free-form Shape Design," Computer Graphics 25(4):257–265, July 1991. A disadvantage to these methods is that they do not perform least-squares type smoothing and they tend to be very complex.

Other methods for editing a figure include scan conversion of a figure using approximating curves. For examples, see Banks and Cohen, "Realtime Spline Curves From Interactively Sketched Data," Computer Graphics 24(2):99–107, 1990; Lyche and Morken, "Knot Removal for Parametric B-Spline Curves and Surfaces," Computer Aided Geometric Design 4(3):217–230, 1987; Plass and Stone, "Curve-Fitting With Piecewise Parametric Cubics," Computer Graphics 17(3):229–239, July 1983; and Schneider, Phoenix: an Interactive Curve Design System Based on The Automatic Fitting of Hand-Sketched Curves, Dept. of Computer Science & Eng., University of Washington, 1988. However, the curve fitting methods for scan conversion described in these publications usually require particular continuity constraints and have centered on various forms of knot removal for approximating the curve, thus limiting their ability to reach higher compression ratios.

In summary, although various methods of editing and smoothing a figure are known, these methods have not attempted to preserve higher-resolution detail beneath the edited region. Further, these methods have not been able to edit a figure at any continuous level of detail or change a figure's character without changing its sweep. These limitations greatly reduce the type of editing capabilities available within field like computer graphics.

SUMMARY OF THE INVENTION

It is an object of the present invention to edit the overall sweep orientation of a figure while maintaining its fine details or character.

It is another object to edit the character or fine details in a figure without affecting its overall sweep orientation.

It is still another object of the present invention to edit a figure at any continuous level of detail, and allow an arbitrary portion of the figure to be affected through direct manipulation.

If is a further object to preserve the higher-resolution detail beneath an edited region and to do so without any extra storage requirements.

It is still a further object of the present invention to smooth a figure continuously between resolution levels to enable the removal of undesirable features from the figure.

It is another object to "fit" or approximate a curve within a guaranteed maximum error tolerance, for scan conversion or other applications without requiring any particular continuity constraints.

In one aspect, the invention is a method of editing a figure comprising the steps of storing a representation of the figure in digital format on a storage medium, and separating the representation of the figure into a general sweep feature and a detail feature. Then the method comprises the steps of editing at least one of the general sweep feature and/or the detail feature to produce a processed general sweep feature and a processed detail feature after the editing step, combining the processed general sweep feature and the processed detail feature into an edited representation of the figure after the editing step, and outputting the edited representation of the figure from the storage medium.

In accordance with another aspect, the invention is a method of reducing the level of detail in a figure, comprising the steps of storing a representation of the figure in digital format on a storage medium, dividing the representation of the figure into segments, and replacing each of the segments with a respective replacement segment having a deviation from the segment it replaced that does not exceed a predetermined error tolerance. The method also comprises the steps of combining the replacement segment for each of the segments into a less detailed representation of the figure, and outputting the less detailed representation of the figure.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIGS. 3A–E show the states of editing the detailed features of a curve without affecting its sweep.

FIGS. 9A–D show the respective curves in FIG. 8 when drawn at a constant size, to show the difference in detail.

FIGS. 14A–C, 14D–G, and 14H show prior art synthesis filters P, Q and the inner product matrices, I, respectively.

DETAILED DESCRIPTION OF THE INVENTION

Figure 1:
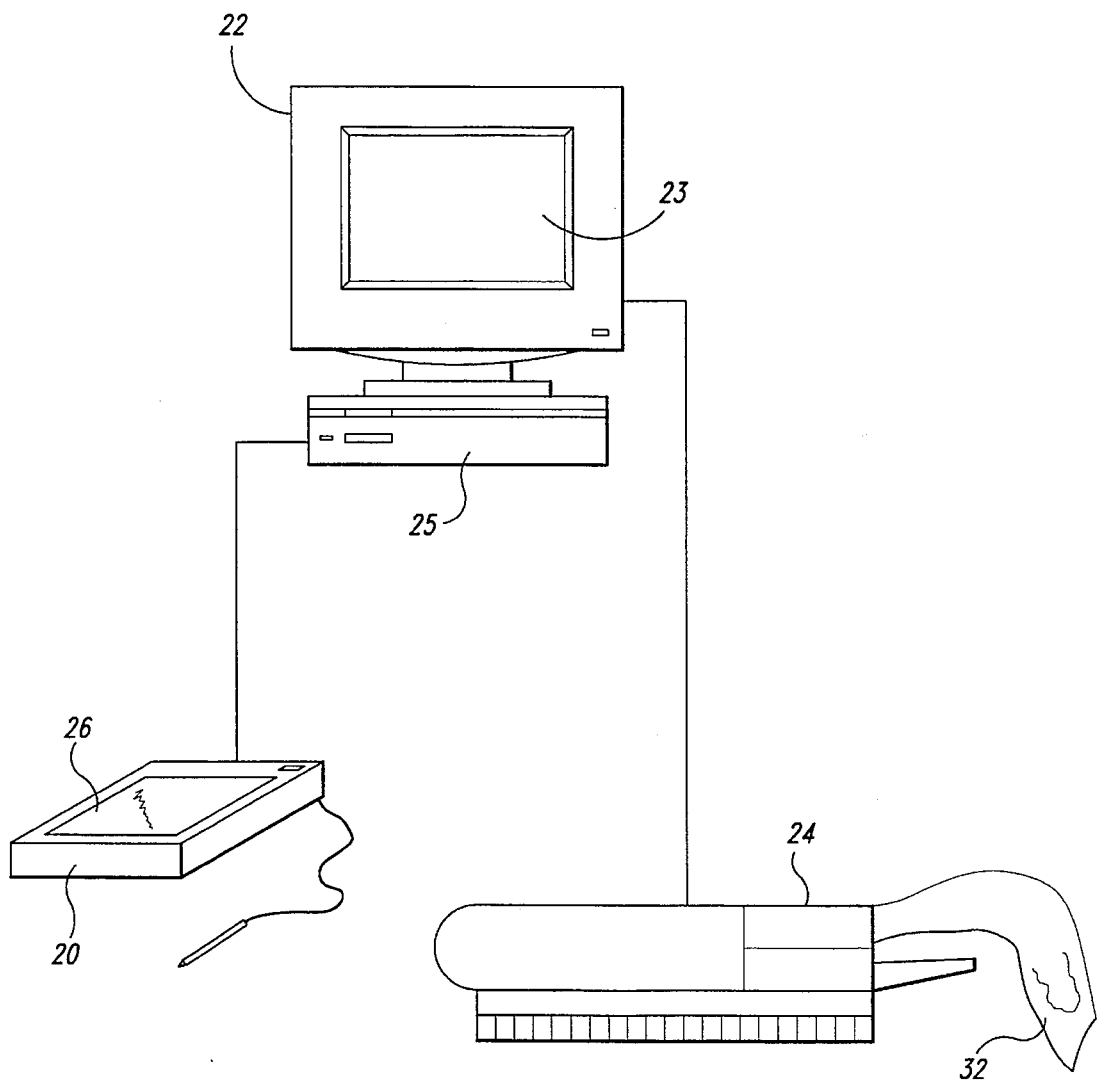
FIG. 1 shows an apparatus for carrying out the present invention for storing and editing a figure.

FIG. 1 shows an acceptable apparatus for a carrying out the present invention. The apparatus includes an input graphics pad 20 and a computer 22. The computer 22 includes a visual output device 23 and an electronic portion 25 having a CPU and a memory. The apparatus of FIG. 1 can be used to carry out the process of the various embodiments of the present invention. For example, the apparatus of FIG. 1 is useful or carrying out the processes of decomposing and reconstructing a figure, editing the overall sweep of a figure, editing the detail features of a figure, smoothing a figure, scan converting a figure, manipulating a figure, and various other aspects of the invention, all of which are described in Finkelstein and Salesin, "Multiresolution Curves," Computer Graphics, Annual Conference Series, 1994, incorporated by reference herein. These processes will not be described.

FIGS. 2A–2E show the process carried out in editing only the overall sweep of a figure. A FIG. 26, also shown in FIG. 1, can be though of as being composed of two portions, an overall sweep portion 28 and a detail portion 30. The FIG. 26 is digitized and stored in the memory of the computer 22 by any suitable means, such as the digital graphics pad 20, by direct creation on computer 22 using the CPU and a graphics program, by being input electronically from a network or any other suitable method.

Figures 2A, 2B, 2C, 2D, 2E:
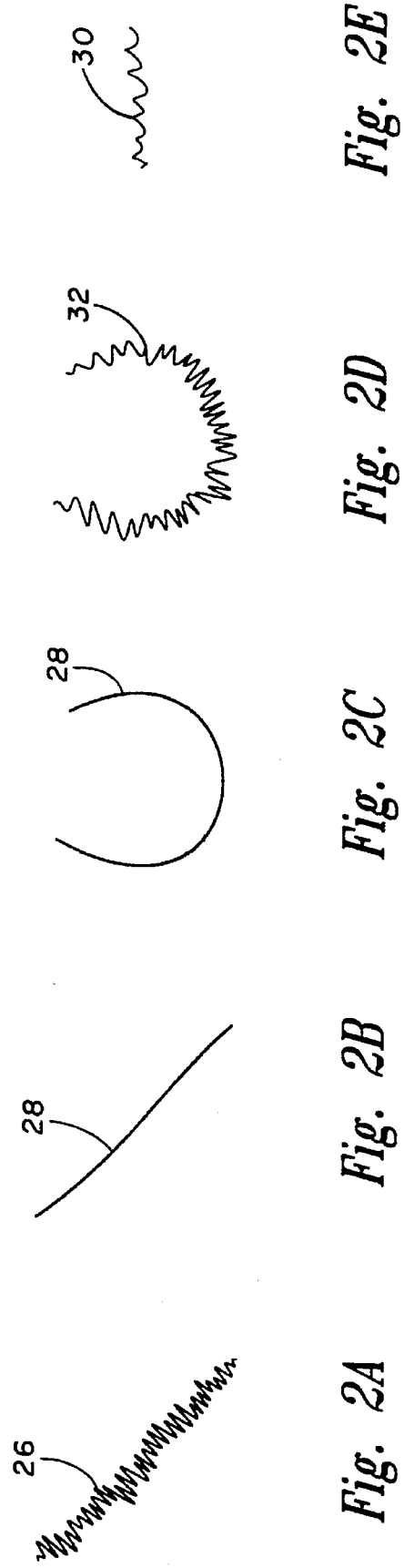
FIGS. 2A–E show the stages of editing the overall sweep of a figure without affecting its detailed features.

Once digitized, the figure's representation may be separated into both its general sweep feature 28, shown in FIG. 2B, and detail feature 30, shown in FIG. 2E. That is, assume a figure is made up on one or more curves $C^n$, then it can be separated into two parts, the low resolution parts, called the general sweep feature herein, and the fine detail, called the detail features herein. Then, according to the invention, all of the curve's low-resolution parts or general sweep features 28 represented as $C^0, \ldots, C^{n-1}$, and detail features 30 represented as $D^0, \ldots, D^{n-1}$, can undergo multiresolution analysis for two very different kinds of curve editing, providing advantages with this invention not possible in the prior art. If some low-resolution general sweep version 28 of the curve $C^j$, as shown in FIG. 2B, is edited to the form shown in FIG. 2C, and then the original detail 30 represented by $D^j, D^{j+1}, \ldots, D^{n-1}$, is subsequently combined with it, an edited representation of the FIG. 32 with a modified overall sweep of the curve but the same detail features will result, as shown in FIG. 2D. This edited representation 32 is output by display on visual display 23 or by printing at a printer 24.

According to the present invention, the overall sweep is edited using known techniques for editing global portions of curves and can be done very quickly and easily. (Many techniques are known today in the art to perform this global editing, all of which would be suitable and thus need not be discussed herein detail.) The overall sweep, having but a few control points, can be altered much more quickly and simply then would be possible if the detail had remained in the FIG. 26. The detail 30 is then recombined into the now edited overall sweep to general an edited FIG. 32.

The FIG. 26, another example of which is shown in FIG. 3A, can be separated into its general sweep feature 34 and its detail feature portion. The detail of the figure's representation is then edited without affecting its overall sweep. If $C^n$ represents the control points of a curve, and $C^0, \ldots, C^{n-1}, D^0, \ldots, D^{n-1}$ denotes the components of its multiresolution decomposition, then editing the detail character of the curve is simply a matter of replacing the existing set of detail functions $D^j, \ldots, D^{n-1}$ with some new set $\hat{D}^j, \ldots, \hat{D}^{n-1}$, and reconstructing. For example, if the overall sweep 34, shown i FIG. 3A, has added to it at elected portions the detail feature 36, shown in FIG. 3D, the edited representation 38 of the figure will appear as shown in FIG. 3B. If a detail 40 is obtained, either by editing, creating or retrieving from a library, the detail 36 can be replaced by the detail feature 40 in some places but not in others, as shown in FIG. 3E. The edited representation 42 will appear as shown in FIG. 3C. Some portion of FIG. 26, such as the right eye 33 or mouth 54 have no editing done to the detail features and retain their original character. Other portions such as the front 35 of the nose 52 or lower portions of the left eye may have a first detail 36 added. Other portions, such as the hair 37 may have the different detail 40 added. In an alternative embodiment the detail feature 40 can be added everywhere to FIG. 26 but in varying amounts to produce the edited representation 42.

With this approach, one can develop a "curve character library" that contains different detail functions, which can be interchangeably applied to any set of curves. The detail functions in the library have been extracted from hand-drawn strokes or other known methods of generating detail functions.

The orientation of a figure's as detail, such as that shown in FIG. 2A, may be selectively controlled when the general sweep of the figure has been changed so that the detail's as orientation to the sweep remains intuitive. There are a number of ways to accomplish this. For example, a parametric curve in two dimensions is most naturally represented as two separate functions, one in x and one in y: $f(u)=(f_x(u), f_y(u))$. Thus, it seems reasonable to represent both the control points $C^j$ and detail functions $D^j$ using matrices with separate columns for x and y. However, encoding the detail functions in this manner embeds all of the detail of the curve in a particular xy-orientation. This is demonstrated by the detail of FIG. 26, as shown in FIG. 4A, which maintains the same xy-orientation when the sweep is changed to an edited representation 44, as shown in FIG. 4B. This representation does not always provide the most intuitive control when editing the sweep of the curve.

Figure 4C:
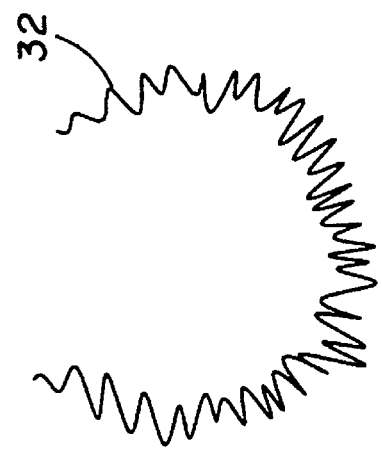
FIGS. 4A–C show the editing of the sweep of a curve using a fixed x y-orientation of the detail feature compared to orientation relative to the tangent of the curve of the detailed feature.
Figure 4B:
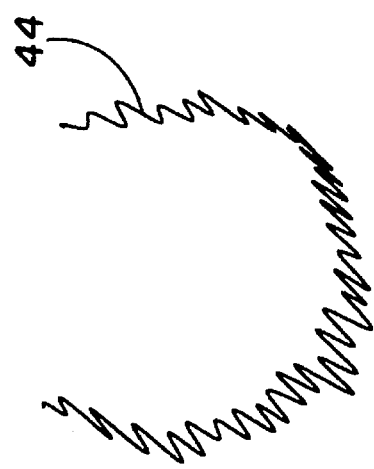
Figure 4A:
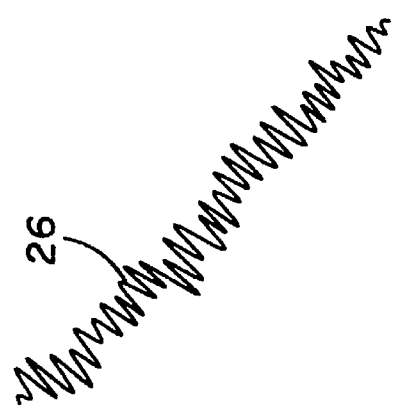

In the present embodiment, detail can be represented with respect to the tangent and normal to the curve at a coarser level, as demonstrated by the edited representation 32, shown in FIG. 4C. Specifically, for computing the reference frame for orienting a detail coefficient $d_i$, the tangent and normal of the curve $f^{j-1}(u_0)$ is used at a parameter position $u_0$ corresponding to the maximum value of the wavelet $\psi_i^j(u)$. The curve f(u) is not longer a simple linear combination of the scaling functions $\Phi^0$ and wavelets $\Psi^j$; instead, a change of coordinates must be performed at each level of reconstruction for the wavelet coefficients $D^j$. However, this process is linear in the number of control points, so it does not increase the computational complexity of the algorithm.

Figure 5A:
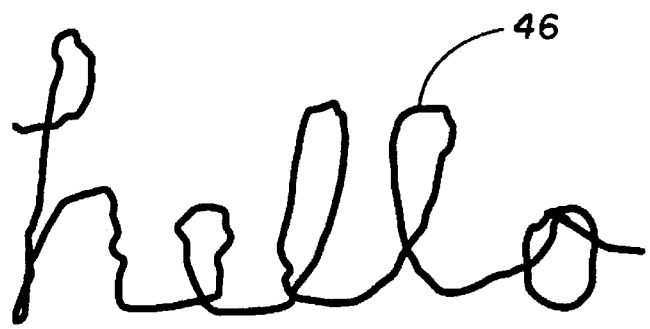
FIGS. 5A–C show various levels of curve smoothing.

The step of recombining the detail feature is not always necessary for editing a figure. For example, a FIG. 46, as shown in FIG. 5A, can be input and stored in the apparatus of FIG. 1. Here, the FIG. 46 can be input by the input graphics pad 20 or one of the various other means discussed above, and digitized, stored and edited by the computer 22, and out put by the display 23 or the printer 24. After the figure's representation has been stored in the computer 22, only the above-described method of decomposition needs to be performed to smooth a curve C having m control points in the figure. This can be accomplished by constructing a best least-squares-error approximating curve with m' control points C', where m'<m. For example, when using endpoint-interpolating uniform B-spline curves, a multiresolution analysis framework allows smoothing for certain values of m an m', where m is equal to $2^j+3$ and m' is equal to $2^{j'}+3$ for some non-negative integers j'<j. The control points C' of an approximately curve are as follows:

$$C'=A^{j'+1}A^{j'+2}\ldots A^j C.$$

Accordingly, the decomposition algorithm, as described by equation (1), can be repeated until a curve with just m' control points is reached. An advantage to this process is that it can be performed at interactive speeds for hundreds of control points using the linear-time algorithm described above.

One notable aspect of the multiresolution curve representation is its discrete nature which makes it easy to construct approximating curves with 4, 5, 7, 11, or any $2^j+3$ controls points efficiently, for any integer level j. However, in the prior art there has not been available the possibility to quickly construct curves that have "levels" of smoothness in between the integer j.

According to the present invention, this can be accomplished by defining a fractional-level curve $f^{j+t}(u)$ for some $0 \leq t \leq 1$ in terms of a linear interpolation between its two nearest inter-level curves $f^j(u)$, and $f^{j+1}(u)$ as expressed in the following equation:

$$\begin{aligned}f^{j+t}(u) &= (1-t)f^j(u)+tf^{j+1}(u) \\ &= (1-t)\,\Phi^j(u)C^j + t\,\Phi^{j+1}(u)\,C^{j+1}.\end{aligned} \quad (15)$$

Figure 5B:
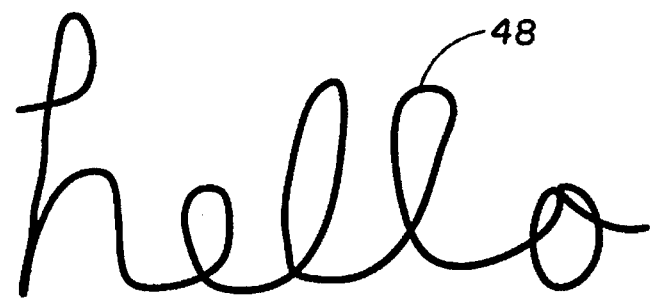
Figure 5C:
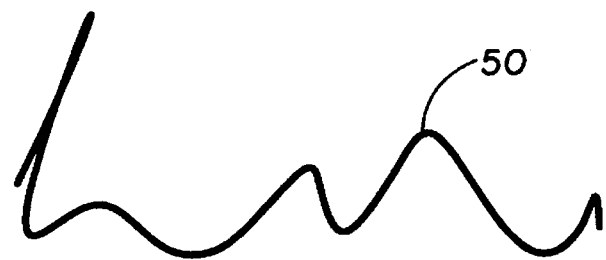

These fractional-level curves allow for continuous levels of smoothing. Further, using fractional level curves, a curve can be transformed continuously from its smoothest (4 control point) form, up to its finest (m control point) version. For example, fractional-level curves of FIG. 46 are shown in FIGS. 5A–5C, where FIG. 5A is the original FIG. 46 at level 8.0, FIG. 5B is a smoother version 48 at level 5.8, and FIG. 5C is an even smoother version 50 at level 3.1. This ability to provide smoothing at fractional levels is one distinct advantage of the present invention.

To accomplish the editing of a figure such as the sweep of a curve, as described with respect to FIG. 26, at an integer level, let $C^n$ be the control points of an original curve $f^n(u)$, let $C^j$ be a low-resolution version of $C^n$, and let $\hat{C}^j$ be an edited version of $C^j$, given by $\hat{C}^j=C^j+\Delta C^j$. The edited version of the highest-resolution curve $\hat{C}^n=C^n+\Delta C^n$ can be computed through reconstruction as follows:

$$\begin{aligned}\hat{C}^n &= C^n+\Delta C^n \\ &= C^n + P^n P^{n-1}\ldots P^{j+1}\Delta C^j.\end{aligned} \quad (16)$$

Figure 6A:
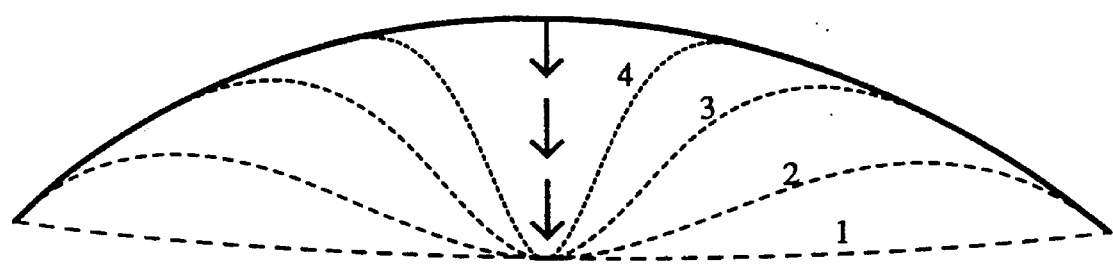
FIGS. 6A and 6B show the effects of editing at integer levels and fractional levels, respectively.

When editing the sweep of the curve at lower levels of smoothing, j affects larger portions of the high-resolution curve $f^n(u)$. At the lowest level, when j=0, the entire curve is affected, while at the highest level, when j=n, only the narrow portion influenced by one original control point is affected. FIG. 6A shows the effect on a curve from levels 1 through 4.

Figure 6B:
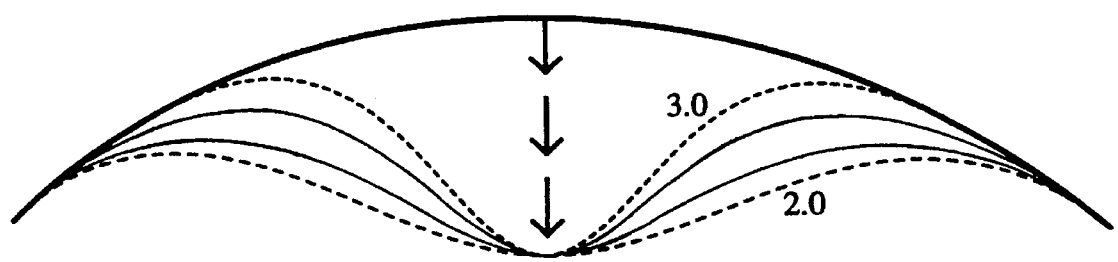

In addition to editing at integer levels of resolution, another aspect of the present invention, which was not available in the prior art, is the possibility of editing at fractional levels as well. The portion of the curve affected when editing at fractional level j+t is interpolated between the portions affected at levels j and j+1. Thus, as t increase from 0 to 1, the portion affected gradually narrows down from that of level j to that of level j+1, as shown in FIG. 6B for levels between 2 and 3.

For the fractional-level curve $f^{j+t}(u)$, described in equation 15, it can be mathematically proven that:

$$\Delta C^j = (1-g(t))\,\Delta \hat{C}^j + g(t)\,A^{j+1}\,\Delta \hat{C}^{j+t} \quad (17a)$$

$$\Delta D^j = \frac{g(t)}{t}\,B^{j+1}\,\Delta \hat{C}^{j+t}. \quad (17b)$$

For a function g(t) that allows $\Delta D^j$ to increase monotonically from 0 to 1, the function $g(t):=t^2$ is an good choice that has been found to work well in practice.

The changes to the high-resolution control points $\Delta C^n$ can be reconstructed by applying equations (17a) and (17b) to equation (3), resulting in the following:

$$\Delta C^n = P^n P^{n-1} \ldots P^{j+2}(P^{j+1}\Delta C^j + Q^{j+1}\Delta D^j) \quad (18)$$

The fractional-level editing defined here varies the editing level continuously giving a smooth and intuitive kind of change in the region of the curve affected, as suggested by FIG. 6B. Further, because the algorithmic complexity is just O(m), an update is easily performed at interactive rates, even for curves with hundreds of control points.

Equations (17a) and (17b) can be easily derived in the following manner. If $C^{j+t}$ is a set of control points that can be associated with the fractional level curve $f^{j+t}$, given by equation (15), then the following equation results:

$$f^{j+t}(u) = \Phi^{j+1}(u) C^{j+t}. \quad (19)$$

By equating the right-hand sides of equations (15) and (18), and then applying equations (5) and (3) an expression for $C^{j+t}$ can be obtained as follows:

$$C^{j+t} = (1-t)P^{j+1}C^j + tC^{j+1} \quad (20a)$$

$$= P^{j+1}C^j + tQ^{j+1}D^j. \quad (20b)$$

If one of the control points $c_i^{j+t}$ is modified by the user, then in order to allow the portion of the curve affected to depend on t in the manner described above, the system will have to automatically move some of the nearby control points. The distance that each of these control points is moved is inversely proportional to t. For example, when t is near 0, the control points in $C^{j+t}$ are moved in conjunction so that the overall effect approaches that of editing a single control point at level j; when t=1, the nearby control points are not moved at all, since the modified curve should correspond to moving just a single control point at level j+1.

Let $\Delta C^{j+t}$ be a vector describing how each control point of the fractional-level curve is modified, where the i-th entry of $\Delta C^{j+t}$ is the user's change to the i-th control point. The other entries reflect the computed movements of the other control points. Rather than solving for $\Delta C^{j+t}$ explicitly, this vector is broken into two components, a vector $\Delta C^j$ of changes to the control points at level j, and a vector $\Delta D^j$ of changes to the wavelet coefficients at level j such that:

$$\Delta C^{j+t} = P^{j+1}\Delta C^j + tQ^{j+1}\Delta D^j \quad (21)$$

Next, if $\Delta \hat{C}^{j+t}$ is defined as the user's as change to the control points at level j+t, hen it is a vector whose i-th entry is $\Delta c_i^{j+t}$, and whose other entries are 0. Also, a new vector $\Delta \hat{C}^j$ is defined as a change to control points at level j necessary to make the modified control point $c_i^{j+t}$ move to is new position. A vector is chosen that is 0 everywhere, except for one or two entries, depending on the index i of the modified control point. By examining the i-th row of the refinement matrix $P^{j+1}$, one can determine whether the modified control point is maximally influenced by either one control point $c_k^{j+1}$ or two control points $c_k^{j+1}$ and $c_{k+1}^{j+1}$ at level j+1. In the former case, $\Delta \hat{c}_k^j$ can be set to $\Delta c_i^{j+t}/P_{i,k}^{j+1}$. In the latter case, $\Delta \hat{c}_k^j$ and $\Delta \hat{c}_{k+1}^j$ are set to be $\Delta c_i^{j+t}/2P_{i,k}^{j+1}$.

By applying either change alone, $\Delta \hat{C}^{j+t}$ or $\Delta \hat{C}^j$, would cause the selected control point to move to its new position; however, the latter change would cause a larger portion of the curve to move. In order to have a "breadth" of change that gradually decreases as t goes from 0 to 1, these two vectors can be interpolated, using some interpolation function g(t):

$$\Delta C^{j+t} = (1-g(t))P^{j+1}\Delta \hat{C}^j + g(t)\Delta \hat{C}^{j+t} \quad (22)$$

Thus, $\Delta C^{j+t}$ will still move the selected control point to its new position, and it will also now control the "breadth" of change as a function of t.

Equations (17a) and (17b) are finally derived by equating the right-hand sides of equations (21) and (22), multiplying with either $A^{j+1}$ or $B^{j+1}$, and then employing the identities of equations 10a and 10b.

By being able to edit figures at fractional levels as well as at integer levels, it is possible to directly manipulate a curve. Therefore, a user can tug on the curve directly rather than on its defining control points. This allows a user, for example, to extend the nose 52 of second version of FIG. 26, shown in FIG. 3A, simply by dragging any portion of the nose.

If a user drags a point of the curve $f^{j+t}(u_0)$ to a new position $f^{j+t}(u_0)+\delta$, then the least-squares change to the control points $\Delta \hat{C}^j$ and $\Delta \hat{C}^{j+t}$ can be computed at levels j and j+t using the pseudo-inverses $(\Phi^j)^+$ and $(\Phi^{j+1})^+$ as follows:

$$\Delta \hat{C}^j = (\Phi^j(u_0))^+ \delta \quad (23a)$$

$$\Delta \hat{C}^{j+t} = (\Phi^{j+1}(u_0))^+ \delta. \quad (23b)$$

These two equations should be interpreted as applying to each dimension x and y separately. Therefore, $\delta$ should be a scalar such as the change in x, and the left-hand side and the pseudo-inverses should both be column-matrices of scalars. The modified control points of the highest-resolution curve can then be computed in the same fashion outlined for control-point manipulation, by applying equations (17a), (17b), and (18).

In the first step of the construction, equations (23a) and (23b) can be computed in constant time, since for cubic B-splines at most four of the entries of each pseudo-inverse are non-zero. The issue of finding the parameter value $u_0$ at which the curve passes closest to the selection point is a well-studied problem in root-finding, which can be handled in an umber of ways as discussed in Schneider, *Phoenix*: An interactive curve design system based on the automatic fitting of hand-sketched curve, Masters Thesis, Department of Computer Science and Engineering, University of Washington, 1988. A preferred method is to scan-convert the curve once to find its parameter value at every illuminated pixel. This approach is easy to implement, and provides a good trade-off between speed and accuracy for an interactive system.

For some applications, it may be more intuitive to directly drag on a high-resolution version a curve in a figure, rather than on the smoothed version of the curve in the figure. In this case, even when the figure'as display resolution is at its highest level, it may still be useful to be able to tug on the figure's at a lower editing resolution. In this way, the amount of detail on the figure that can be manipulated by dragging a single point can be increased by lowering the editing resolution. This type of control can be supported quite easily by setting $\delta$ to be the change in the high-resolution curve at the dragged point $f^n(u_0)$, and using the same equations (23a) and (23b) above.

Figure 7A:
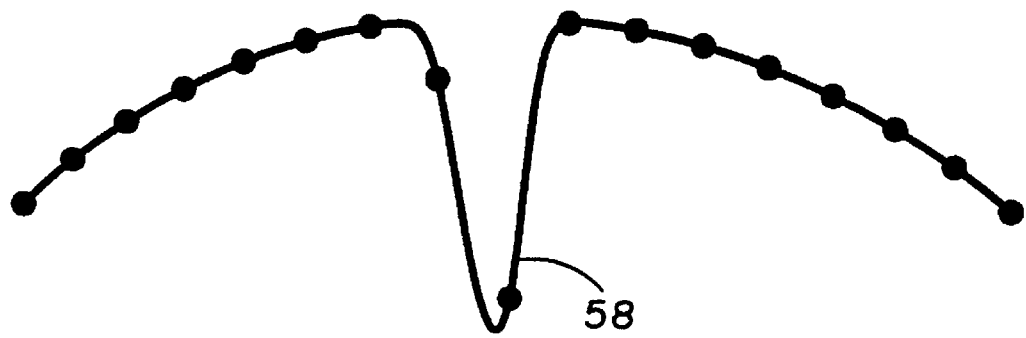
FIGS. 7A–C show the effects of direct manipulation on a curve having control points at non-uniform distances.
Figure 7B:
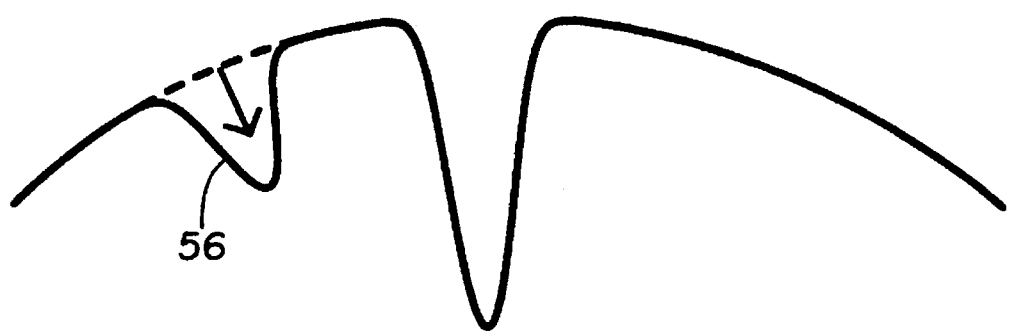
Figure 7C:
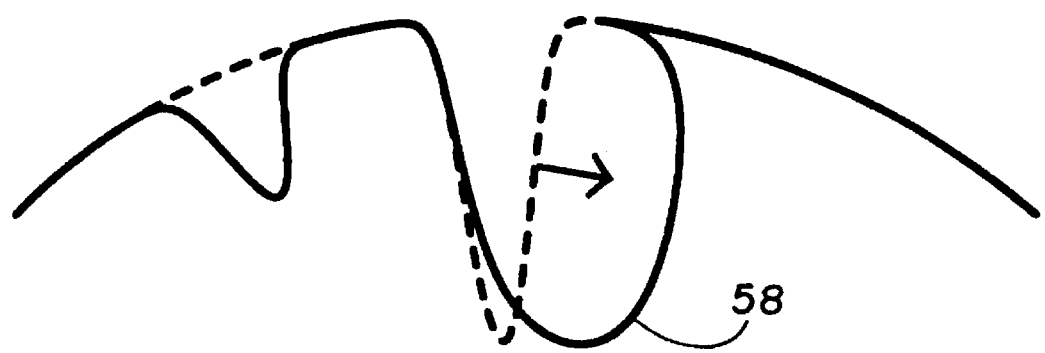
Figure 7D:
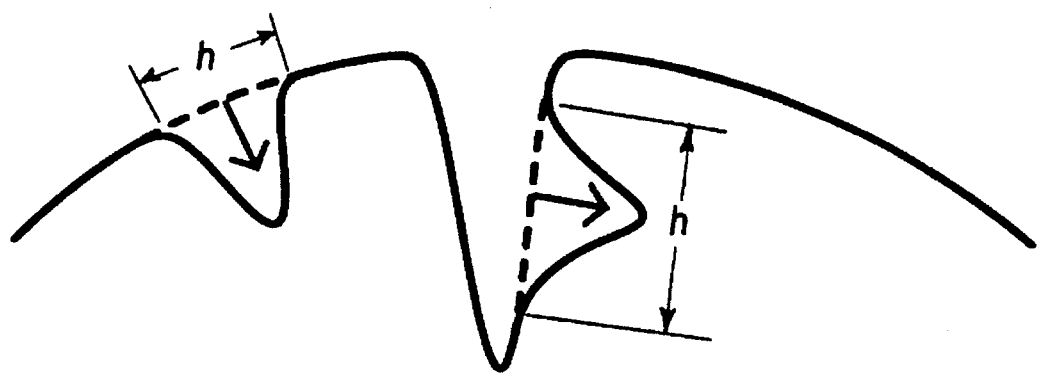
FIG. 7D shows the effects when a specific fraction of a curve is edited.

Unfortunately, when directly manipulating a curve, such as dragging the mouth 54 of FIG. 26, as shown in FIG. 3A, using different points also the curve, the manipulation will not necessarily affect constant-length portions of the curve as expected. For example, if FIGS. 7A–7D were to represent a portion of the mouth 54, it is obvious that the control points are not spaced uniformly along the figure. FIG. 7B shows that direct manipulation at indent 56 on the left part of the figure affects a much smaller fraction of the curve than does direct manipulation at the same level in the middle indent 58, as shown in FIG. 7C. Accordingly, if the mouth 54 of FIG. 26 is dragged, it is possible that an unexpected and undesirable manipulation will result. To prevent this, a specified parameter h of the figure can be edited, as shown in FIG. 7D, by having the system determine the appropriate editing level, as described below.

For the system to determine the appropriate editing level 1, the parameter h, which describes the desired length of the editable portion of a B-spline curve of the figure, must be specified by the user. The parameter h can be specified using any type of physical units, such as screen pixels, inches, or percentage of the overall curve length. The system computes an appropriate editing level $l=j+t$ that will affect a portion of the curve of about h units in length, centered at the point $f^n(u_0)$ being dragged.

To estimate l for each integer-level editing resolution j, let $h^j(u_0)$ denote the length of $f^n(u)$ affected by editing the curve at the point $f^n(u_o)$. The length $h^j(u_0)$ is easily estimated by scan-converting the curve $f^n(u)$ to determine the approximate lengths of its polynomial segments, and then summing over the lengths of the segments affected when editing the curve at level j and parameter position $u_0$. Next, define j− and j+ to be, respectively, the smallest and largest values of j for which $h^{j-}(u_0) \geq h \geq h^{j+}(u_0)$. To choose the editing level 1, linear interpolation between these two bounding levels j− and j + can be performed as follows:

$$l = \frac{h - h^{j+}}{h^{j-} - h^{j+}}.$$

Finally, by representing l in terms of an integer level j and fractional offset t, equations (23a) and (23b), followed by equations (17a), (17b), and (18), can be applied as before. Though in general this construction does not precisely cover the desired portion h, in practice it yields an intuitive and meaningful control.

In this embodiment of the present invention, a multiresolution analysis is performed for B-spline curves. More specifically, the invention has been described in detail for an embodiment useful with a common type of cubic B-splines, defined on a knot sequence that is uniformly spaced everywhere except at its ends, where its knots have multiplicity 4. Of course, the invention is applicable to many other curves besides cubic B-splines, but an explanation of how it is used with cubic B-splines is helpful to see how the invention could be used on many other types of curves.

Figures 8A, 8B, 8C, 8D:
FIG. 8A–D show the scan-converting of a curve within a guaranteed maximum error tolerance.

A FIG. 60, shown in FIG. 8D, can be processed by the apparatus in FIG. 1 after being digitized and stored in the memory of computer 22. FIG. 60 can then be output on a printer 24 or a display 23 at varying levels of size. Figures, such as FIG. 60, can be very complex and have hundreds or potentially thousands of control points. However, often this type of figure must be printed in a very small area, and with conventional scan conversion methods, all the control points of the curves in the figure are used. This is wasteful in terms of the amount of network traffic that must be sent to a printer and in terms of the processing time required by the printer to render figures having so many control points within just a few square pixels.

The following embodiment is a form of curve compression that is suitable for the scan conversion of figures. This form of curve compression uses an algorithm that requires an approximate curve to have a guaranteed error tolerance, in terms of printer pixels, from the original curve. However, it does not require any particular continuity constraints, as are usually required in data-fitting applications printing.

The simple removal of wavelet coefficients can be used to achieve a least-squares or $L^2$, error metric between an original curve and its approximate versions, as described above. However, for scan conversion a $L^2$ error metric is not very useful for measuring the degree of approximation. For example, an approximate cure $\tilde{f}(u)$ can be arbitrarily far from an original curve $f^n(u)$ and still achieve a particular $L^2$ error bound as long as it deviates from the original over a small enough segment.

In order to scan convert a curve to some guaranteed precision-measurement, such as the maximum deviation in printer pixels, an $L^\infty$ norm on the error needs to be used. There are many ways to achieve such a bound. The method described here is a simple and fast one, although methods with higher compression ratios are certainly possible.

After the representation of FIG. 60 is digitized in the computer 22, it is then divided into segments. A segment is replaced with another less complex segment until one is found that does not differ from the original by ore than a predetermined error tolerance. This is performed for each segment until a new, less detailed representation 62 occurs. The FIG. 60, also shown in FIG. 9D, can have its detail progressively reduced, as shown in FIGS. 8A–8C and 9A–9C.

More specifically, the above can be accomplished by letting $s_i^j$ (with $0 \leq i \leq 2^j - 1$) be a segment of the cubic B-spline curve $f^j(u)$, defined by the four control points $c_i^j, \ldots, c_{i+3}^j$. Note that each segment $s_i^j$ corresponds to exactly two segments $s_{2i}^{j+1}$ and $s_{2i+1}^{j+1}$ at level j+1.

The objective is to build a new approximating curve $\tilde{f}(u)$ for $f(u)$ by choosing different segments at different levels such that $\|\tilde{f}(u) - f^n(u)\|_\infty$ is less than some user-specified error tolerance $\epsilon$ for all values of u.

If some function ErrBound $(S_i^j)$ returns on a bound on the $L^\infty$ error incurred from using the segment $S_i^j$ of some approximate curve $f^j(u)$ in place of the original segments of $f^n(u)$ to which it corresponds, then a curve can be scan-converted to within any error tolerance $\epsilon$ by passing to there cursive routine DrawSegment, shown below, where the single segments $S_0^0$ corresponds to the lowest-level curve $f^0(u)$. This routine recursively divides the segment to varying levels so that the collection of segments it produces approximates the curve to within $\epsilon$.

Procedure DrawSegment $(s_i^j)$:
    if ErrBound $(s_i^j) < \epsilon$ then
        Output segment $s_i^j$ as a portion of $\tilde{f}(u)$
    else
        DrawSegment $(s_{2i}^{j+1})$; DrawSegment $(s_{2i+1}^{j+1})$
    end if
End Procedure To construct ErrBound routine, let $M^j$ be the B-spline-to-Bézier-basis conversion matrix, as discussed in Bartels, Beatty, and Barsky, An introduction to splines for use in computer graphs and geometric modeling, Morgan Kaufmann, 1987. The matrix is for curves with $2^j + 3$ control points. Further, let $E^j$ be a column vector with entries $e_i^{\ j}$ defined by $$E^j := M^j Q^j D^{j-1}.$$

The vector $E^j$ provides a measure of the distance that the Bézier control points migrate when reconstructing the more detailed curve at level j from the approximate curve at level j−1. Since Bézier curves are contained within the convex hull of their control points, the magnitudes of the entries of $E^j$ provide conservative bounds on approximations to the curve due to truncating wavelet coefficients.

A bound $\delta_i^{\ j}$ on the $L^\infty$ error incurred by replacing segment $S_i^{\ j}$ with its approximation at level j−1 is given by:

$\delta_i^j \leq \max_{i \leq k \leq i+3} \{\|e_k^j\|_2\}.$

The ErrBound routine can then be described recursively as follows:

```
Procedure ErrBound (s_i^j):
   if j = n then
      return 0
   else
      return max{ErrBound(s_{2i}^{j+1})+δ_{2i}^{j+1}, ErrBound(s_{i+1}^{j+1})+δ_{i+1}^{j+1}}
   end if
End Procedure
```

The approximate curve $\tilde{f}(u)$ is described by a set of Bézier segments, which are used to generate a PostScript file, see PostScript Language Reference Manual, Addision-Wesley Publishing Company, Inc., 1985. The scan-conversion algorithm, as described, produces approximate curves $\tilde{f}(u)$ that are not even $C^0$ continuous where two segments of different levels abut. Since the absolute error in the final set of pixels produced is the only concern, relaxing the continuity of the original curve is reasonable for scan conversion. A $C^0$ continuity can be achieved, however, without increasing the prescribed error tolerance, by simply averaging together the end control points for adjacent Bézier segments as a post-process. These $C^0$ curves have been found to look slightly better than the discontinuous curves; they also have a more compact representation in PostScript.

A multiresolution representation for figures using, for example, endpoint-interpolating B-spline curves, has been described within the preferred embodiment. Further, a single representation supporting a variety of display and editing operations in a simple and efficient manner has also been described within the embodiment. The operations described herein are very general and can be readily extended to other types of representations besides the B-spline curves described herein.

There are many applications and extensions to be above-described editing methods. For example, an important extension is to generalize the multiresolution curve representation and editing operations to respect discontinuities of various orders that have been intentionally placed into a curve by the designer. This extension would allow the techniques to be applied more readily to font design, among other applications. One approach is to try using the multiresolution analysis defined on nonuniform B-splines as discussed by Daehlen and Lyche in Mathematical Methods in Computer Aided Geometric Design II, pp. 135–160, Academic Press, New York, 1992.

Further, the algorithms have so far used only complete wavelet decompositions of thecurve's original control points. However, in order to support curve editing at an arbitrarily high resolution, it would be convenient to have a mechanism in place for extending the wavelet representation to a higher level of detail in certain higher-resolution portions of the curve than in others. One such sparse representation might use pruned binary trees to keep track of the various wavelet coefficients at different levels of refinement, in a manner very similar to the one used by Berman et al. for representing multiresolution images in Computer Graphics, Annual Conference Series, 1994.

Figure 10B:
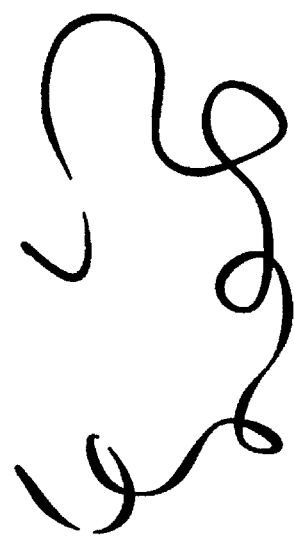
FIGS. 10A and 10B show curves having varying thickness.
Figure 10A:
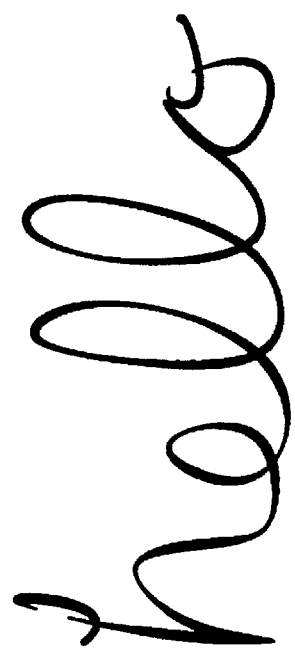

Also, for illustrations, it is useful to associate other properties with curves, such as color, thickness, texture, and transparency, as demonstrated by Hsu and Lee in Computer Graphics, Annual Conference Series, 1994. These quantities may be considered extra dimensions in the data associated with each control point. Much of the machinery for multi-resolution editing should be applicable to such curves. As a preliminary test of this idea, the curve editor has ben extended with a thickness dimension. The thickness along the curve is governed by the thicknesses defined at the control points. It is possible to modify this parameter at any level of resolution, just as one edits the position of the curve. FIGS. 10A and 10B show curves with varying thickness.

Yet another extension of the techniques of the present embodiment is to surfaces. As a test of multiresolution surface editing, a surface editor can be built that allows a user to modify a bicubic tensor-product B-spline surface at different levels of detail. FIGS. 11A–D show several manipulations applied to a surface having over 1225 control points modeling a human face. It is worth noting that tensor-product surfaces are limited in the kinds of shapes they can model seamlessly. In particular, fractional-level display and editing are applicable in the same way as for curves and tensor-product surfaces. In addition, the compression technique for scan-converting curves might also be used for rendering simplified versions of polyhedra within guaranteed error tolerances.

Figure 11A:
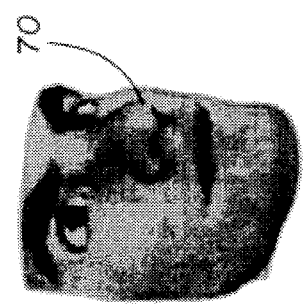
FIGS. 11A–D show surface manipulation at different levels of detail.
Figure 11B:
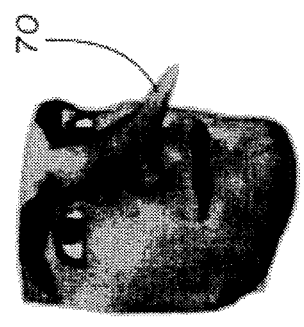

Under current prior art techniques, a user must manipulate many of the 1225 control points to edit the FIG. of 11A to create a desired effect. With the invention, however, the user need not be concerned with the details of each control point and its location on the face. Rather, the user can set a parameter h of a variable value as described herein. FIG. 11B represents a control point 70 at the tip of the nose being stretched with a relative low h value. Only that small portion of the nose on the face with the narrow limits of h are affected, resulting in a long, pointed tip of the nose on a normal face and normal portions of the nose.

Figure 11C:
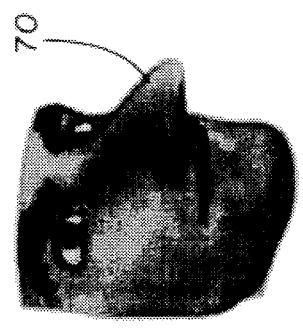
Figure 11D:
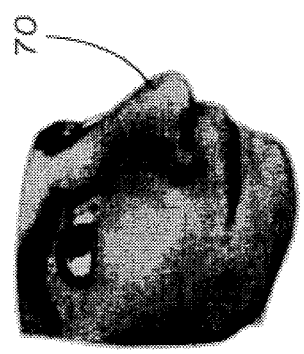
Figures 12A, 12B, 12C:
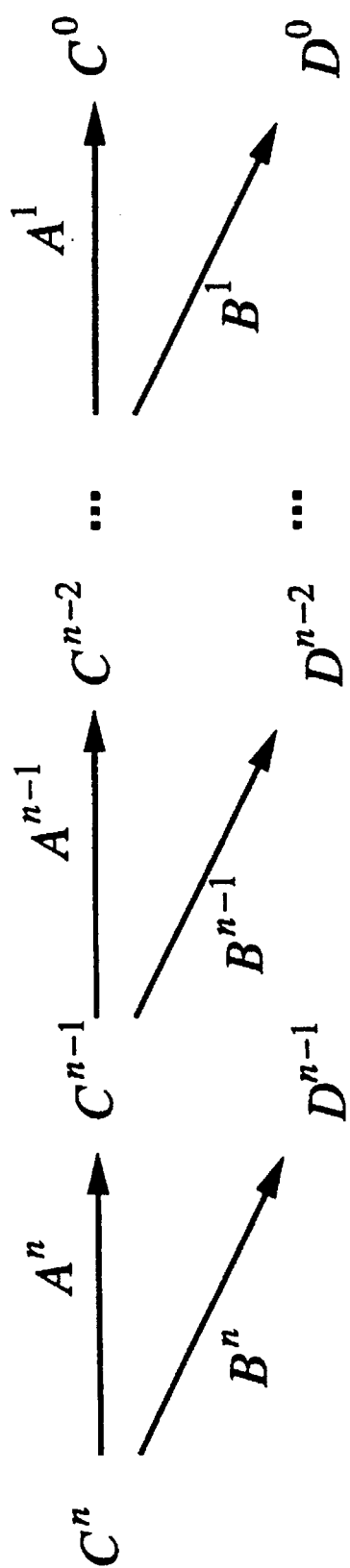
FIGS. 12A–C are prior art graphical representations of a filter bank.
Figure 13A:
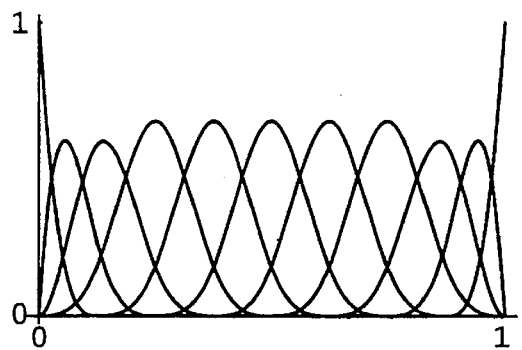
FIGS. 13A–E show prior art B-spline scaling functions.
Figure 13B:
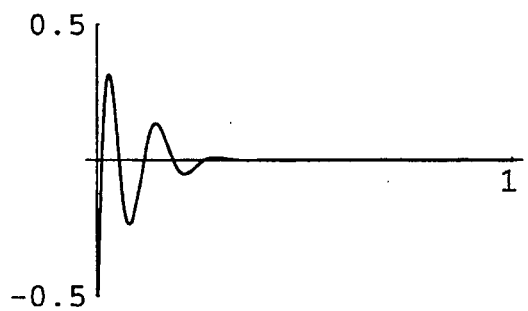
Figure 13C:
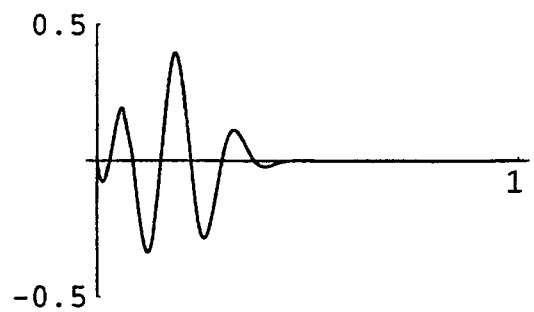
Figure 13D:
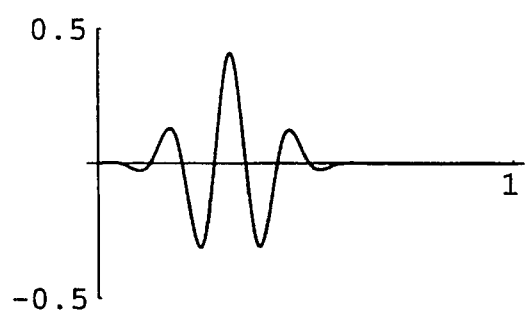
Figure 13E:
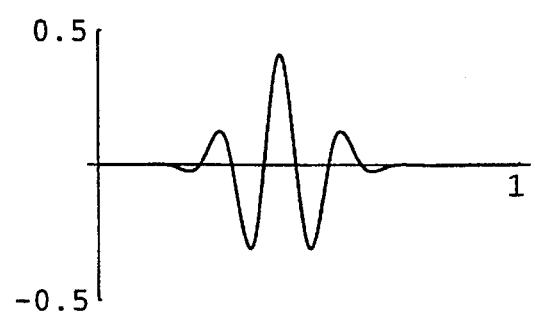

FIG. 11C illustrates a longer h value, spanning over the entire nose, from top to bottom and from side to side but not including any features other than the entire nose. Editing the same control point 70 by the same value results now in an enlargement of the entire nose; the rest of the face is unaffected. FIG. 11D represents a still larger value of h, extending over the majority of the face, with the result of an equal enlargement of the entire face. Of course, the parameter h can be selected or varied independently in all three directions, height, width, and depth, as desired, or alternatively, set to be equal in all directions.

In conclusion, a figure can be manipulated using a multiresolution curve representation, based on wavelets, that conveniently supports a variety of operations such as smoothing a curve, editing an overall form of a curve while preserving its details, and approximating a curve within a given error tolerance for scan conversion. The embodiments described herein support continuous levels of smoothing as well as direct manipulation of an arbitrary portion of a curve. This multiresolution representation requires no extra storage beyond that of the original control points, and the algorithms using the representations are both simple and fast.

While the detailed description above has been expressed in terms of specific examples, those skilled in the art will appreciate that many other methods could be used to accomplish the purpose of the disclosed procedure. Accordingly, it can be appreciated that various modifications of the above-described embodiments may be made without departing from the spirit and scope of the invention. Therefore, the spirit and scope of the present invention are to be limited only by the following claims.

We claim:

1. A method of editing a figure comprising the steps of:

storing a presentation of the figure as one or more curves in digital format on a storage medium;

separating the stored representation of the figure into a general sweep portion and a detail portion, the general sweep portion comprising a sweep component for each of the one or more curves, the detail portion comprising a detail component for each of the one or more curves;

editing at least one of the general sweep portion and the detail portion to generate a processed general sweep portion and a processed detail portion, respectively;

combining the processed general sweep portion and the processed detail portion into an edited representation of the figure; and outputting the edited representation of the figure.

2. A method of editing a figure according to claim 1 wherein the editing steps comprises replacing the detail portion with a new detail portion from a character library.

3. A method of editing a figure according to claim 1 wherein the editing step comprises altering a direction of the general sweep portion.

4. A method of editing a figure according to claim 1 wherein the editing step comprises the steps of:

manipulating the general sweep portion; and maintaining the detail portion at a position normal to the general sweep portion.

5. A method of editing a figure according to claim 1 wherein the step of storing the representation of the figure comprises storing an amount of control point values corresponding to a resolution of the figure.

6. A method of editing a figure having a resolution based upon an amount of control points, each control point having a value, the method comprising the steps of:

storing a representation of the figure in digital format on a storage medium;

separating the stored representation of the figure into a general sweep feature and a detail feature by, lowering the resolution of the figure repeatedly by decreasing the amount of control points until the control point values correspond to the general sweep feature; and generating detail values during each step of lowering the resolution to preserve the detail feature;

editing at least one of the general sweep feature and the detail feature to produce a processed general sweep feature and a processed detail feature, respectively;

combining the processed general sweep feature and the processed detail feature into an edited representation of the figure; and outputting the edited representation of the figure.

7. A method of editing a figure according to claim 6 wherein the editing step comprises altering at least one of the control point values corresponding to the general sweep feature.

8. A method of editing a figure according to claim 6 wherein the editing step comprises altering at least one of the detail values corresponding to the detail feature.

9. A method of editing a figure according to claim 6 wherein the editing step comprises replacing the detail values corresponding to the detail feature with new detail values from a character library.

10. A method of editing a figure according to claim 6 wherein the editing step can be performed at any fractional level of the resolution of the figure.

11. A method of editing a figure according to claim 10 wherein the editing step comprises altering at least one of the control point values corresponding to the general sweep feature by direct manipulation.

12. A method of editing a figure according to claim 10 wherein the resolution level of the figure and the fractional level of the resolution is determined by a specified parameter.

13. A method of editing a figure according to claim 12 wherein the specified parameter comprises a percentage of an overall length of the figure.

14. A method of editing a figure according to claim 12 wherein the specified parameter comprises a physical unit of measurement along the figure.

15. The method according to claim 1 wherein the editing step includes editing only the general sweep portion and the detail portion is not edited such that the processed general sweep portion has been edited and the processed detail portion has not been edited such that the combining step includes combining an edited general sweep portion and a non-edited detail portion.

16. The method according to claim 1 wherein the editing step includes editing only the detail portion and the general sweep portion not being edited such that the processed detail portion has been edited and the processed general sweep portion has not been edited such that said combining step includes combining an edited detail portion and a non-edited general sweep portion.

17. The method according to claim 1 wherein the both general sweep portion and the detail portion are edited such that the combining step is combining an edited general sweep portion with an edited detail portion.

18. The method according to claim 1 wherein the figure comprises at least one multiresolution curve.

19. A method of editing a figure according to claim 1 wherein the editing step comprises altering a control point value corresponding to the general sweep portion by direct manipulation.

20. A method of editing a figure according to claim 1 wherein the editing step comprises altering both the general sweep portion and the detail portion by direct manipulation of at least one curve of the figure.

21. A method of reducing the level of detail in a figure comprising the steps of:

storing a representation of the figure in digital format on a storage medium, the figure having one or more curves;

dividing the representation of the figure into segments;

replacing each of the segments with a respective replacement segment having a deviation from the segment it replaced that does not exceed a predetermined error tolerance;

combining the replacement segment for each of the segments into a less detailed representation of the figure; and outputting the less detailed representation of the figure.

22. A method of reducing the level of detail in a figure according to claim 21 wherein the step of outputting sends the less detailed representation of the figure to a printing device.

23. A method in a computer system of editing a curve represented as an initial discrete signal $C^n$, which is expressed as a column vector of m samples $[c_1^n, \ldots c_m^n]^T$, the method comprising steps of:

decomposing the initial discrete signal into a lower-resolution representation having m' samples, wherein m>m', by filtering the initial discrete signal $C^n$ with a first analysis filter $A^n$ to generate a next lower resolution signal $C^{n-1}$, such that $C^{n-1}=A^n C^n$; and capturing detail lost $D^{n-1}$ in the filtering step, by filtering the initial discrete signal $C^n$ with a second analysis filter $B^n$ such that $D^{n-1}=B^n C^n$;

displaying the next lower resolution signal $C^{n-1}$ and the captured detail lost $D^{n-1}$ on the display device;

editing the curve by manipulating only one of the displayed next lower-resolution signal and the captured detail lost; and reconstructing an edited version of the initial discrete signal by applying synthesis filters to the next lower resolution signal and the captured detail lost, after the editing step.

24. A computer-readable memory medium containing instructions for controlling a computer processor to edit a figure having one or more curves by performing the steps of:

storing a representation of the figure in digital format on a storage medium;

separating the stored representation of the figure into a general sweep portion and a detail portion, the general sweep portion comprising a sweep component for each of the one or more curves, the detail portion comprising a detail component for each of the one or more curves;

editing either the general sweep portion or the detail portion, or editing both the general sweep portion and the detail portion, to generate a processed general sweep portion and a processed detail portion, respectively;

combining the processed general sweep portion and the processed detail portion into an edited representation of the figure; and outputting the edited representation of the figure.

25. The computer-readable memory medium of claim 24, the figure having a resolution, wherein the editing step can be performed at a fractional level of the resolution of the figure.

26. The computer-readable memory medium of claim 24 wherein the step of storing the representation of the figure comprises storing an mount of control point values corresponding to a resolution of the figure.

27. The computer-readable memory medium of claim 24 wherein the editing step comprises altering only the detail portion.

28. The computer-readable memory medium of claim 24 wherein the editing step comprises altering only the general sweep portion.

29. The computer-readable memory medium of claim 24 wherein the editing step uses direct manipulation to alter the figure.

30. A computer system comprising:

a storage medium;

a stored representation of a figure having one or more curves in digital format on the storage medium;

a separating mechanism for separating the stored representation of the figure into a general sweep portion and a detail portion, the general sweep portion comprising a sweep component for each of the one or more curves, the detail portion comprising a detail component for each of the one or more curves;

an editing mechanism for altering either the general sweep portion or the detail portion, and for altering both the general sweep portion and the detail portion, to generate a processed general sweep portion and a processed detail portion, respectively;

combination mechanism for combining the processed general sweep portion and the processed detail portion into an edited representation of the figure; and an output mechanism for outputting the edited representation of the figure.

31. The computer system of claim 30, the figure having a resolution, wherein the editing means edits the figure at a fractional level of the resolution of the figure.

32. The computer system of claim 30, further comprising direct manipulation means used by the editing means to alter at least one of the general sweep portion and the detail portion.

\* \* \* \* \*